3,788,917
METHOD FOR HOT GAS ACTIVATION OF THERMOPLASTIC SEALING SURFACES

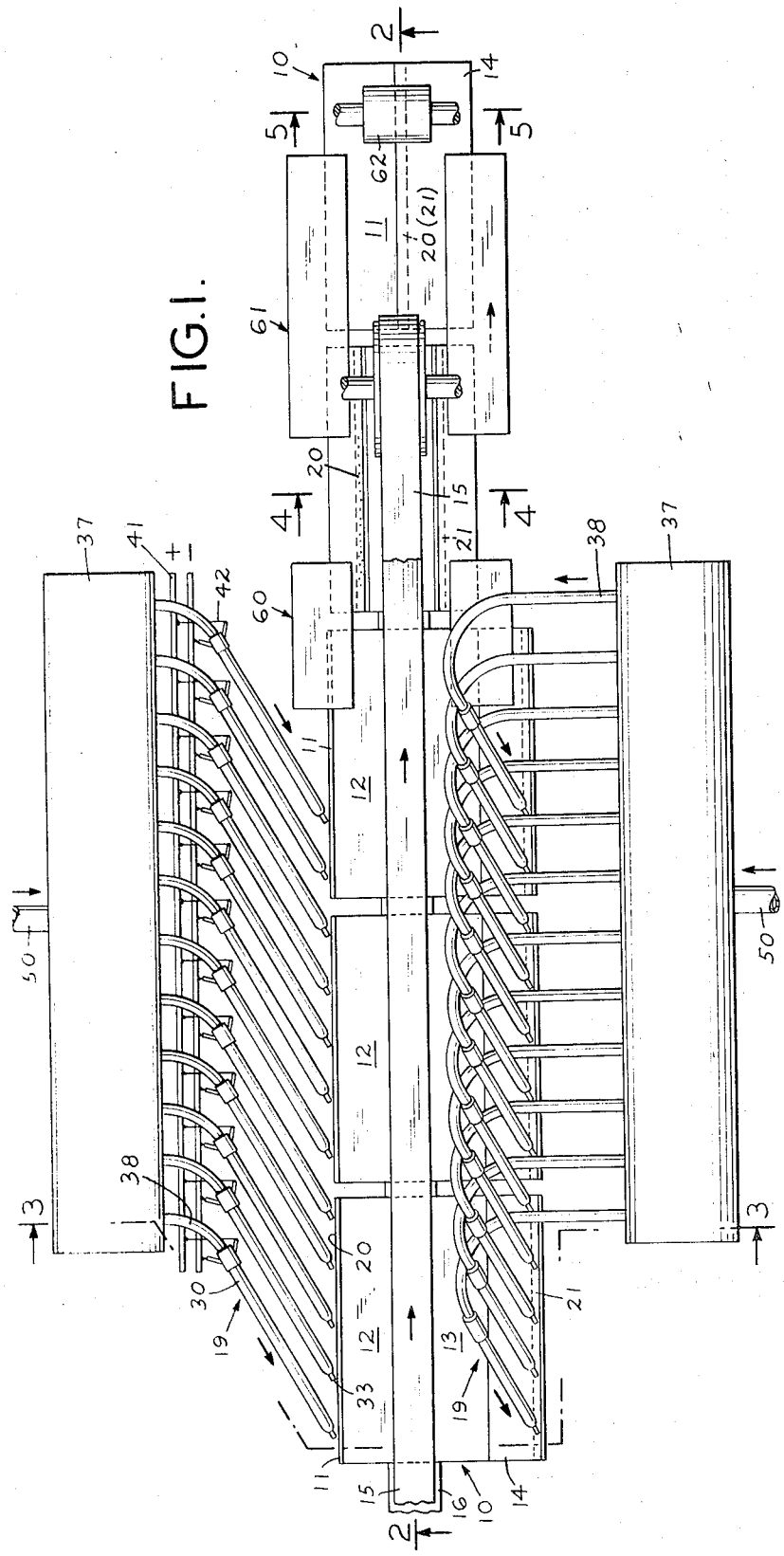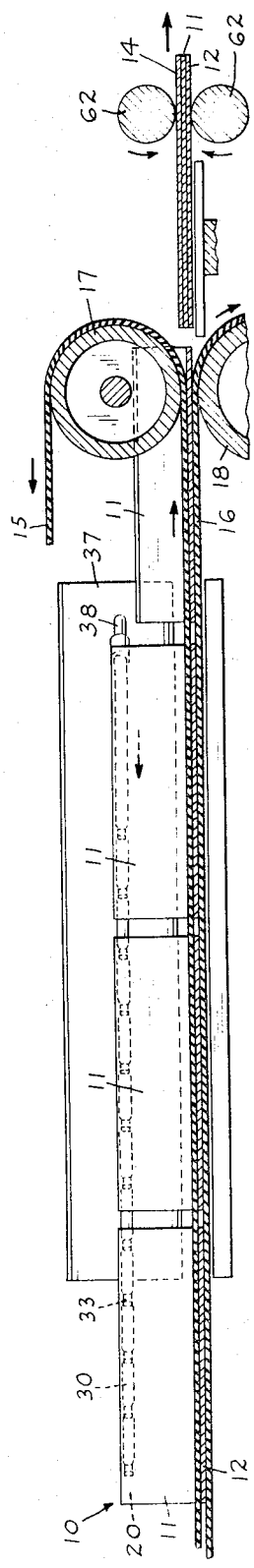

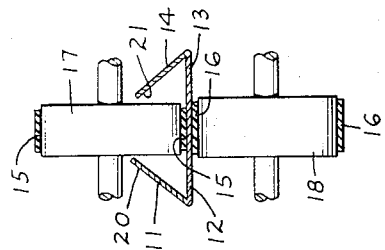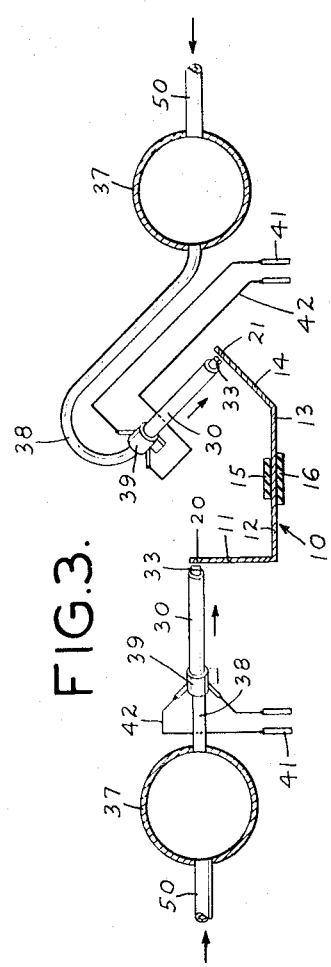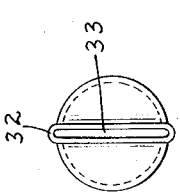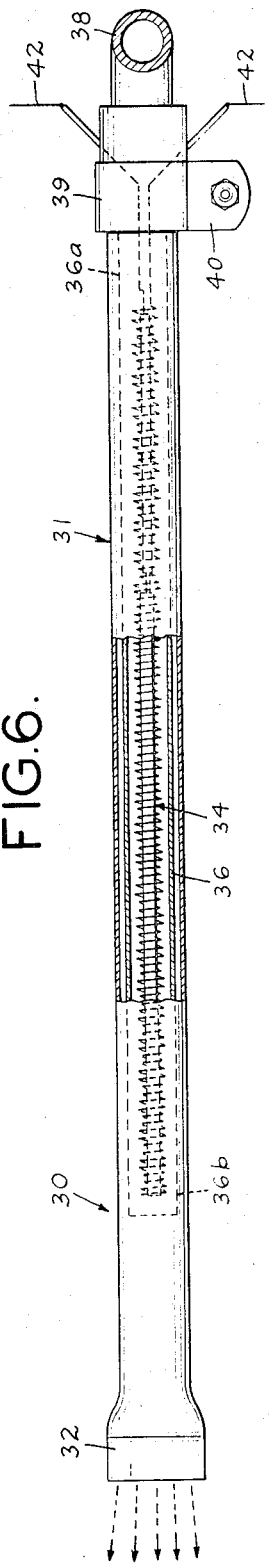

Frank Raymond Linda, Bridgeport, Conn., assignor to International Paper Company, New York, N.Y.
Filed July 17, 1970, Ser. No. 55,746
Int. Cl. B29c 25/00
U.S. Cl. 156—82
31 Claims

ABSTRACT OF THE DISCLOSURE

Continuously advancing thermoplastic surfaces which are to be sealed together are contacted with a stream of a hot inert gas which impinges upon the surfaces in a direction opposed to that in which the surfaces are advancing and at an angle of from about 10 to 40° measured from the plane of the advancing surfaces. The gas treated surfaces are then brought into contact under pressure to effectuate a seal between the surfaces. The stream of hot gas preferably has the configuration of a thin flat ribbon with the long dimension of the cross section of the ribbon being substantially parallel to the plane of the thermoplastic surface so as to create an "air knife" which effectively removes the boundary layer from the thermoplastic surface.

An apparatus is provided for carrying out the above described process which comprises means for advancing the surfaces continuously, nozzle means disposed to impinge against the advancing surfaces a stream of hot gas in the manner called for above, means for supplying gas to the nozzle, means for heating the gas supplied to the nozzle, and means for bringing the gas treated surfaces into contact under pressure to effectuate sealing of the surfaces.

BACKGROUND OF THE INVENTION

This invention relates to methods and apparatus for activating thermoplastic surfaces which are to be sealed together by applying to said surfaces a stream of a hot inert gas under prescribed conditions.

It is known in the packaging art that effective seals can be obtained by coating the two surfaces to be sealed together with a thermoplastic material, such as polyethylene, and then heating the polyethylene to a temperature sufficient to make it tacky and sticky whereupon the polyethylene surfaces are brought into contact under pressure to produce a seal. The process of heating the thermoplastic to prepare it for sealing is generally referred to as "activation" of the thermoplastic surface. Thermoplastic surfaces have been activated in a variety of ways, such as, for example, by subjecting the thermoplastic to electrical discharges, by heating the thermoplastic by applying thereto a hot gas, or by the use of dielectrics or high radio frequencies. It is known, for example, that thermoplastics can generally be activated by applying thereto a stream of a hot gas, such as air; however, such activation procedures have not produced acceptable results and are not in widespread commercial usage today. The most commonly employed method of activating thermoplastic surfaces is by subjecting the surfaces to a burning gas flame. The gas flame technique, for example, is widely used throughout the milk carton industry.

One of the problems encountered in activating a thermoplastic surface is the boundary layer of gas which is ordinarily associated with the surface as it is advanced through various types of sealing equipment. This boundary layer provides a barrier to the penetration of the heat into the thermoplastic surface and consequently it has been necessary to use the extremely high temperatures obtained in the flame technique as a means of punching through this boundary layer and transferring the heat into the underlying thermoplastic surface so as to make the surface sticky and tacky and suitable for sealing.

The gas flame technique has several disadvantages. Since the temperature of the gas flame is quite high, i.e., about 2000° F. the flame has a tendency to overheat the substrate beneath the thermoplastic surface once it has penetrated through the overlying boundary layer. The result of this ovrheating can cause a phenomenon known as "blocking" once the cartons are assembled and packaged in a shipping case. Blocking refers to the sticking together of the assembled cartons in areas adjacent to the seal caused by the retention of excessive heat in the seal area due to the high temperature of the flame. This heat is usually retained in the substrate and can create temperatures in the thermoplastic material which exceed the melting point of the thermoplastic. Since the residual heat is not dissipated from the thermoplastic prior to assembly of the carton and packaging of the carton into a shipping case, the seal areas of the cartons are still sufficiently tacky to stick to adjoining cartons, thus making it difficult to separate the cartons for use.

Another disadvantage of the gas flame technique, is that it has a tendency to entrap water into the sealed seam ultimately producing leaks in the seal in the regions of entrapped water. Since water is a product of combustion of the gas flame, it is believed that most of the water is introduced into the area of the seal by the flame itself.

A further disadvantage of the gas flame technique is the relatively high amount of heat, expressed in terms of B.t.u.'s which is required to adequately activate the thermoplastic surface. Since the flame must first punch through the boundary layer on the surface before it can activate the underlying thermoplastic, it is usually necessary to subject the thermoplastic surfaces to a number of flame sources in series before the boundary layer can be penetrated. Moreover, if the substrate is highly reflective, a portion of the open gas flames, which can be considered as light sources, will be reflected away from the surfaces resulting in the further inefficient use of the heat.

A still further disadvantage of the flame technique is the relative inability to precisely control the area of the thermoplastic surface which is to be heated. The flame tends to overlap into adjacent areas which may not contain thermoplastic causing scorching or, if the adjacent area does contain a thermoplastic, it gives the plastic an undesirable glossy appearance and can embrittle the plastic and also reduce the barrier properties of the plastic.

It is therefore a general object of this invention to provide a method and apparatus for producing effective thermoplastic seals without the attendant disadvantages described hereinabove for previously employed thermoplastic activation processes.

It is another object of this invention to provide methods and apparatus for eliminating leaking seals due to the entrapment of water vapor in the seal.

It is another object of this invention to provide methods and apparatus for eliminating sources of water vapor in areas which are in proximity to the thermoplastic seals.

It is another object of this invention to provide methods and apparatus to effectively activate the thermoplastic surfaces using less heat and without the risk of overheating the surfaces and thereby causing blocking between the seals.

It is another object of this invention to provide methods and apparatus to activate thermoplastic surfaces for sealing without scorching adjacent areas of the carton.

It is a still further object of this invention to provide methods and apparatus to effectuate the removal of the boundary layer associated with a moving surface such as a thermoplastic surface instead of transmitting activation energy through this boundary layer.

These and other objects of this invention will be apparent from a total reading of the specification.

SUMMARY OF THE INVENTION

Method

This invention relates to a method for sealing together continuously advancing thermoplastic surfaces. In accordance with the method of this invention, the thermoplastic surfaces to be joined together are contacted with at least a single stream of a hot inert gas. The gas stream impinges upon the advancing surfaces in a direction which is opposed to the direction in which the thermoplastic surfaces are advancing. The gas stream further impinges upon the advancing thermoplastic surfaces at an angle of from about 10 to 40° measured from the plane of the thermoplastic surfaces. The gas treated thermoplastic surfaces are then brought into contact under the influence of pressure to effectuate a seal between the surfaces.

An inert gas is any gas which does not produce an adverse physical or chemical effect upon the surfaces to be sealed and includes such gases as air, nitrogen, and argon.

The term "thermoplastic" is intended to encompass all of the common thermoplastics which are used in the sealing of cartons, such as, for example, polyethylene and polypropylene. Typically, these thermoplastics form a coating layer on a substrate of a suitable packaging material.

The stream of hot gas impinging upon the advancing thermoplastic surfaces is preferably in the form of a thin flat ribbon, the long dimension of the cross section of the ribbon being substantially parallel to the plane of the advancing surfaces, and the thin flat ribbon of impinging hot gas contacting the advancing thermoplastic surfaces at an angle, as described above, this angle being measured between the plane of the advancing surfaces and the plane of the flat thin ribbon of impinging vapor. Such an arrangement produces, in effect, an "air knife" which functions to remove the boundary layer traveling with the advancing thermoplastic surfaces in the initial stages of its contact with the surfaces and to thereupon transmit heat to the exposed thermoplastic surface to activate the surface for sealing in the latter stages of its contact with the advancing surfaces. The velocity of the impinging stream of hot gas must be of sufficient magnitude to remove substantially the entire boundary layer from the advancing thermoplastic surfaces, and ordinarily, its velocity will be such as to exceed the linear velocity at which the thermoplastic surfaces are advancing.

By eliminating contact of the thermoplastic surfaces with an open flame, water is no longer available in the area of the seal and thus the seal will no longer suffer the disadvantages resulting from entrapped water. Moreover, since the gas stream removes the boundary layer traveling with the thermoplastic surfaces, it no longer becomes necessary to heat the gas to the high temperatures required to penetrate or punch through the boundary layer to reach the thermoplastic surfaces. The result is that the surfaces and substrate are not overheated and blocking is effectively eliminated. Moreover, by requiring less heat, substantial savings are realized in the economy of operating the process. Since the hot gas stream is devoid of any light, the reflection of useful energy away from a reflective substrate is minimized thereby providing for efficient usage of the heat.

The dimensions of the impinging hot gas stream can be carefully controlled by the use of properly designed nozzles and suitable apparatus so as to insure that only the sealing area of the carton is exposed to heat thereby eliminating the undesirable effects of embrittlement and loss of barrier properties resulting when other areas of the carton are unintentionally heated. Since the surfaces can be activated using lower temperatures, scorching of the adjacent areas of the carton is also greatly minimized.

Apparatus

This invention also relates to an apparatus for sealing together thermoplastic surfaces employing the above described process which comprises: (1) means for continuously advancing the thermoplastic surfaces which are to be sealed together; (2) nozzle means which are disposed adjacent to these advancing surfaces but in spaced relationship to the said surfaces for impinging against the advancing surfaces a stream of a hot gas in a direction opposed to that in which the surfaces are advancing and at an angle of about 10 to 40° as measured from the plane of the advancing surfaces; (3) means for feeding gas to the nozzle means; (4) means for heating the gas supplied to the nozzle means to the required temperature; and (5) means for bringing the gas treated activated thermoplastic surfaces into contact under pressure whereby sealing of the surfaces is effectuated.

In a preferred embodiment of the apparatus of this invention, the nozzle means comprises a nozzle having for its discharge orifice a long thin slit which is adapted to impinge upon the advancing thermoplastic surfaces a thin flat stream or ribbon of gas as described above. The long dimension of the nozzle slit is substantially parallel to the plane of the adjacent advancing thermoplastic surface so as to produce an "air knife" as described hereinabove.

The apparatus may comprise one or more nozzles as required depending upon such parameters as the speed at which the surfaces are advancing past the nozzles and the temperature of the gas emanating from the nozzles.

BRIEF DESCRIPTION OF THE DRAWINGS

FIG. 1 is a top view of a preferred embodiment of the apparatus of this invention.

FIG. 2 is a sectional view taken generally along the line 2—2 of FIG. 1 but eliminating the conventional panel folding equipment of FIG. 1.

FIG. 3 is a sectional view taken generally along the line 3—3 of FIG. 1.

FIG. 4 is a sectional view taken generally along the line 4—4 of FIG. 1 but eliminating the conventional equipment for folding the panels.

FIG. 5 is a sectional view taken along the line 5—5 of FIG. 1.

FIG. 6 is a side view of a preferred embodiment of a nozzle assembly used in the apparatus of this invention.

FIG. 7 is an end view of the nozzle assembly of FIG. 6 showing the thin slit orifice of the nozzle.

DESCRIPTION OF THE PREFERRED EMBODIMENTS

Referring to FIG. 1, it is seen that a carton blank 10, typically a milk carton blank, comprising four side wall panels 11, 12, 13 and 14, is sandwiched between two continuously advancing rubber fabric belts 15 and 16, as best seen in FIG. 2, which frictionally grasp blank 10 and advance it in the direction shown by the arrows in FIG. 1 through the apparatus of FIG. 1. Belts 15 and 16 are driven by rotating cylinders 17 and 18, respectively.

As the blank 10 advances through the apparatus, it passes a bank of nozzles 19 which are angularly disposed with respect to surfaces 11 and 14 of advancing blank 10 and in spaced relationship to surfaces 11 and 14. Prior to arriving at nozzle bank 9, it is desirable to partially fold blank 10 into its assembled position, as best seen in FIG. 3, wherein it is apparent that wall 11 has been previously folded using conventional folding equipment into a substantially vertical position whereas wall panel 14 has been folded to a position 45° above the horizontal. The purpose of the prefolding operation is to permit the carton blank to be completely folded as soon as possible after the thermoplastic sealing surfaces are activated by the hot air discharged from nozzel bank 19, for reasons made clear hereinbelow.

Blank 10 is typically a polyethylene covered cardboard milk container whose polyethylene coating will be activated for sealing along the outer edge 20 of wall panel 11 and the inner edge 21 of wall panel 14.

The partially folded blank 10 advances past the bank of nozzles 19 which impinge upon edge 20 of panel 11 and edge 21 of panel 14 a stream of heated air in a direction opposed to that in which the panels are advancing and at an angle between about 10 and 40° as measured from the plane of the thermoplastic surface which is adjacent to the nozzles.

A detailed view of the individual nozzle assemblies 30 which make up nozzle banks 19 is best seen in FIGS. 6 and 7. Nozzle assembly 30 comprises an outer hollow metallic tube 31 containing at one end a flared portion 32 which contains disposed therein a discharge orifice 33 of a thin vertical slit construction. Disposed within hollow tube 31 is an air heating element 34 which is preferably a serpentine heating element such as those commercially available from Sylvania Electric Products, Inc. The serpentine filament 34, which is generally fabricated from a ferrous alloy when the gas is air and from tungsten when the gas is nitrogen or another non-oxygen containing gas, is enclosed in a quartz tubing sheath 36 which is open at both ends. Air from an air source such as manifold 37 (see FIG. 1) is directed into quartz sheath 36 at one end 36a via feed conduit 38 which communicates with quartz sheath 36 by means of coupling 39. Coupling 39 is provided with a bracket 40 for mounting the individual nozzle assembly 30 in banks as shown in FIG. 1. The serpentine heating element 34 is electrically connectable to bus-bar 41 (see FIG. 1) by means of cables 42, cables 42 communicating with filament 34 through collar 39. Once the air is heated by element 34, it is discharged from the quartz sheath 36 by the end 36b and passes out of nozzle assembly 30 through orifice 33.

Referring to FIGS. 6 and 7, it is seen that the thin vertical slit configuration of nozzle orifice 33 will produce a flat thin stream of air, which has been heated by filament 34 to the appropriate temperature, having the configuration of a thin flat ribbon, thickness of the ribbon generally approximating the thickness of orifice 33 at least in close proximity to orifice 33.

The long dimension of the cross section of the flat ribbon of air emanating from orifice 33 is preferably substantially parallel to the thermoplastic surface adjacent orifice 33 so that the air stream will impinge upon the thermoplastic surfaces to form an air knife which will lift up and remove the undesirable boundary layer traveling with the advancing thermoplastic surfaces.

The dimensions of orifice 33 are not particularly critical and will vary depending upon the application. For example, as the orifice 33 is placed closer to the thermoplastic surface to be heated, the thickness of orifice 33 can become progressively larger. The thickness will be selected to insure that the stream of hot vapor emanating from orifice 33 remains relatively thin so that the stream does not lose its sharpness as an air knife. On the other hand, if orifice 33 is removed further away from thermoplastic surfaces, it is desirable to keep the thickness or smaller dimension of the orifice quite small to avoid undue spreading of the vapor stream once it leaves the orifice with subsequent loss in the sharpness of the air knife so produced. In general, orifice thicknesses ranging from about .02 to .04 inch, and preferably .035 to .037 inch, are quite suitable. The width or larger dimension of orifice 33 can generally vary from about ¼ to 1½ inches, with a width of from about .4 to .6 inch preferred.

Orifice 33 should be maintained quite close to the adjacent advancing thermoplastic surface it is to heat. In general, orifice 33 should be physically separated from the thermoplastic surface to be activated by a distance ranging from about .065 to .16 inches measured from the center line of the orifice slot normal to the thermoplastic surface adjacent thereto. Preferably this distance will range from about .10 to .11 inches.

Air is fed under pressure to manifolds 37 via air feed line 50. The pressurized air is then fed through conduit 38 to the serpentine heating element 34 disposed within nozzle assembly 30 whereupon the air is heated to the appropriate temperature; the heated air emerges through orifice 33 as a thin flat ribbon of hot air which impinges against the advancing thermoplastic surface adjacent thereto. The thin hot layer initially functions as an air knife to remove the boundary layer traveling with the advancing thermoplastic surfaces. Once this boundary layer is removed, it functions to transmit heat into the thermoplastic surface to activate it for sealing.

The velocity of the hot air emanating from orifice 33 must be sufficiently high to remove at least a substantial portion of the boundary layer associated with the advancing thermoplastic surfaces. In general, it has been found that this velocity is preferably at least twice that of the linear velocity at which the blanks 10 are advancing through the apparatus. The air velocity may vary anywhere between from 2 to 10 times the linear velocity of blank 10 and preferably is from about 7 to 10 times the linear velocity of blanks 10. Blanks 10 typically advance through the apparatus at a linear velocity of from about 1600 to 2400 feet per minute.

The air passing through the serpentine heating element 34 must be heated to a temperature sufficiently high to properly activate the thermoplastic surface. Generally, the air is heated to a temperature between about 1200 to 2000° F. and preferably from about 1750 to 1850° F.

The air employed is preferably that from the surrounding atmosphere and, as such, will contain small amounts of water vapor. However, when this air is heated to the temperatures of interest, the water contained therein is converted to super-heated dry steam. After the hot air stream has impinged upon the advancing thermoplastic surfaces to remove the boundary layer and efficiently activate the surfaces for sealing, the stream reflects or bounces away at substantially the same angle as its angle of incidence and thereupon expands into the surrounding atmosphere. The moisture in this reflected air will not condense until dew point conditions are encountered at some point remote from the thermoplastic surfaces. Thus, these surfaces remain dry and do not entrap water vapor to any substantial degree when they are sealed together.

A plurality of nozzle assemblies 30 are provided, said assemblies being disposed in succession with respect to the advancing thermoplastic surfaces to provide contact in series of the surfaces with the hot gas stream emanating from each orifice 33. The number of nozzle assemblies required will of course vary depending upon numerous parameters such as, for example, the speed at which the blanks 10 are advancing through the apparatus and the heat of the gas emanating from orifices 33.

After the thermoplastic surfaces 20 and 21 of blank 10 have been activated by passing through the blank 19 of nozzle assemblies 30, as shown in FIG. 1, the hot gas treated blank 10 enters a conventional panel folding means, shown in block form at 60, whereupon wall panels 11 and 14 are folded inwardly into the position best seen in FIG. 4. Blank 10 continues to advance into a second conventional folding panel means, shown in block form at 61, whereupon activated thermoplastic surfaces 20 of panel 11 and 21 of panel 14 are brought into contact, as best shown in FIG. 5, prior to passing through the nip of pressure rolls 62 which seal the activated thermoplastic surfaces together to complete the operation.

The conventional panel folding means shown at 60 and 61 typically comprise, plows, belts, and swords and are well known to those skilled in the packaging art.

The thin flat ribbon of air emanating from orifices 33 impinges upon the appropriate thermoplastic surfaces of blank 10 at an angle between about 10 and 40 degrees and preferably between about 27 and 33 degrees, as measured between the plane of the thermoplastic surface and the plane of the thin flat ribbon of hot vapor impinging thereupon. It has been found that if this angle falls below about 10 degrees, the boundary layer traveling with the thermoplastic surfaces cannot be adequately removed therefore effectively preventing transfer of heat into the underlying thermoplastic. On the other hand, if the angle exceeds about 40 degrees, only the top portion of the boundary layer is removable, again making it difficult to transmit heat across the remaining thickness of the boundary layer into the underlying thermoplastic.

In addition to the blank 19 of nozzle assemblies 30 depicted in FIG. 1, a second bank of nozzle assemblies can be vertically disposed below the bank 19 shown in FIG. 1 in the cases where it becomes desirable to activate a larger thickness of thermoplastic surface. Moreover, the nozzle assemblies characterized by the thin slit discharge orifice 33 can be replaced with nozzles having circular or other shaped discharge orifices provided the hot gas stream emanating from these orifices is opposed to the direction of travel of the advancing surfaces and contacted the surfaces at an angle of between about 10 and 40 degrees as measured from the advancing surfaces.

The above described embodiments of the methods and apparatus of this invention are illustrative only, and such alterations and modifications thereof as would be suggested to one skilled in the art are contemplated to fall within the scope and spirit of the claims appended hereto.

What is claimed is:

1. In a method for sealing together continuously advancing thermoplastic surfaces which comprises impinging upon at least one of said advancing surfaces a stream of a hot inert gas and then bringing said surfaces into contact under the influence of pressure to effectuate a seal between the surfaces, the improvement which comprises impinging said gas stream upon said surface in a direction opposed to the direction in which the surface is advancing, said stream impinging on said surface at an angle measured from the plane of said surface of from about 10 to about 40 degrees, and at a velocity in excess of the linear velocity at which the surfaces are advancing, said velocity of said gas stream being sufficient to remove at least a substantial portion of the boundary layer associated with the advancing thermoplastic surfaces.

2. The method of claim 1 wherein said angle is from about 27 to 33 degrees.

3. The method of claim 2 wherein the velocity of the impinging stream of hot inert gas ranges from about 2 to about 10 times the linear velocity at which the surfaces are advancing.

4. The method of claim 3 wherein said hot gas is at a temperature of from about 1200 to 2000° F.

5. The method of claim 4 wherein said gas is air.

6. The method of claim 5 wherein said thermoplastic surfaces are polyethylene.

7. The method of claim 6 wherein said polyethylene surfaces are disposed along the edges of a carton blank.

8. The method of claim 7 wherein the linear velocity of the advancing surfaces ranges from about 1600 to 2400 feet per minute.

9. The method of claim 1 wherein said impinging stream of hot gas has the configuration of a thin flat ribbon.

10. In a method for sealing together continuously advancing thermoplastic surfaces which comprises impinging upon said advancing surfaces at least one flat thin stream of a hot inert gas and then bringing the gas treated surfaces into contact under the influence of pressure to effectuate a seal between the surfaces, the improvement which comprises impinging said gas stream upon said surfaces in a direction opposed to the direction in which said surfaces are advancing and at an angle of from about 10 to 40 degrees measured between the plane of the surfaces and the plane of the flat thin stream of impinging gas, the velocity of said gas stream being of sufficient magnitude to remove at least a substantial portion of the gaseous boundary layer from said advancing surfaces.

11. The method of claim 10 wherein the long dimension of the cross section of the substantially flat thin stream of hot inert gas is substantially parallel to the plane of the thermoplastic surface upon which it impinges.

12. The method of claim 11 wherein a plurality of flat thin streams of a hot inert gas are employed, each stream contacting the surfaces in a series sequence as the surfaces advance.

13. The method of claim 12 wherein the velocity of the impinging stream of hot gas ranges from about 2 to about 10 times the linear velocity at which the surfaces are advancing.

14. The method of claim 13 wherein said angle varies from about 27 to 33 degrees.

15. The method of claim 14 wherein said surfaces are advancing at a linear velocity of from about 1600 to 2400 feet per minute.

16. The method of claim 15 wherein the temperature of the impinging stream of hot gas ranges from about 1200–2000° F.

17. The method of claim 16 wherein the velocity of the impinging stream of hot vapor ranges from about 7 to 10 times the linear velocity of the advancing surfaces, and wherein the temperature of the stream of hot gas is from about 1750 to 1850° F.

18. The method of claim 10 wherein the thickness of the flat thin stream of impinging gas ranges from about 0.02 to 0.04 inches and the width from about ¼ to 1½ inches.

19. The method of claim 18 wherein the thickness of the flat thin stream of impinging gas ranges from about .035 to .037 inches and the width from about 0.4 to 0.6 inches.

20. The method of claim 17 wherein the thickness of the flat thin stream of impinging gas ranges from about 0.035 to .037 inches and the width from about 0.4 to 0.6 inches.

21. The method of claim 20 wherein said thermoplastic surfaces are polyethylene.

22. The method of claim 21 wherein said polyethylene surfaces are disposed along the edges of a carton blank.

23. The method of claim 22 wherein said blank is of a milk container carton.

24. The method of claim 20 wherein said hot gas is air.

25. The method of claim 22 wherein said carton blank is partially folded prior to exposure of the thermoplastic surfaces to the impinging stream of hot gas.

26. In a method for sealing together continuously advancing thermoplastic surfaces which comprises impinging upon said advancing surfaces at least one flat thin stream of a hot inert gas and then bringing the gas treated surfaces into contact under the influence of pressure to effectuate a seal between the surfaces, the improvement which comprises impinging said gas stream upon said advancing surfaces in a direction opposed to the direction in which said surfaces are advancing, and at angle of from about 27 to 33 degrees between the plane of the surfaces and the plane of the flat thin stream of impinging gas, said thin flat gas stream having a velocity of from about 7 to 10 times the linear velocity of the advancing surfaces, and a temperature of from about 1200 to 2000° F., the thickness of said flat thin stream of gas ranging from about 0.02 to 0.04 inches and the width from about ¼ to 1½ inches, said advancing surfaces having a linear velocity of from about 1600 to 2400 feet per minute, whereby at least a substantial portion of the gaseous boundary layer associated with said advancing surfaces is removed.

27. The method of claim 26 wherein the gas is air, the temperature of the air is from about 1750 to 1850° F., and the thickness of the flat thin air stream is from about 0.035 to 0.037 inches and the width from about 0.4 to 0.6 inches.

28. The method of claim 27 wherein the thermoplastic is polyethylene and wherein said polyethylene is disposed along the edges of a carton blank.

29. In a method for sealing together continuously advancing thermoplastic surfaces which comprises impinging upon at least one of said advancing surfaces at least one thin flat stream of a hot inert gas and then bringing said surfaces into contact under the influence of pressure to effectuate a seal between the surfaces, the improvement which comprises impinging said gas stream upon said surface in a direction opposed to the direction in which the surface is advancing, said stream impinging on said surface at an angle of from about 10 to 40 degrees measured between the plane of the thin flat gas stream and the plane of the advancing surface, and at a velocity of from about 2 to about 10 times the linear velocity at which said surface is advancing whereby a substantial portion of the boundary layer associated with said advancing surface is removed by the action of said thin flat stream impinging upon the surface.

30. In a method for sealing together advancing surfaces which become tacky upon heating which comprises impinging upon at least one of said surfaces a stream of a hot inert gas to render said surface tacky and then bringing said surfaces into contact under the influence of pressure to effectuate a seal between the surfaces, the improvement which comprises forming the hot gas stream into the configuration of a flat thin ribbon and impinging said formed gas stream against said advancing surface in a direction opposite to that at which the surface is advancing so that the plane of the formed gas stream and the advancing surface upon which it impinges are angularly disposed with respect to each other with an angle of between about 10 to about 40 degrees between said planes, and further impinging said formed gas stream against said advancing surface with a velocity which is at least twice that of the linear velocity of the advancing surface, whereby said impinging gas stream removes a substantial portion of the boundary layer and heats the advancing surface to a point where it becomes sufficiently tacky to be sealed to another surface.

31. The method of claim 30 wherein the velocity of the impinging gas stream is from about 7 to 10 times the linear velocity of the advancing surfaces.

References Cited
UNITED STATES PATENTS

| | | | |
|---|---|---|---|
| 3,380,229 | 4/1968 | Nelson | 156—497 X |
| 3,029,175 | 4/1962 | Stenquist | 156—82 |
| 2,783,693 | 3/1957 | Felber | 93—52 |
| 2,786,511 | 3/1957 | Reid | 156—497 X |
| 3,207,049 | 9/1965 | Monroe et al. | 156—497 X |
| 3,300,350 | 1/1967 | Flynn | 156—497 X |
| 3,394,635 | 7/1968 | Hoyrup et al. | 156—497 X |
| 3,416,411 | 12/1968 | Hittenberger et al | 156—497 X |
| 3,466,838 | 9/1969 | Sorenson et al. | 156—497 |

GEORGE F. LESMES, Primary Examiner

J. J. BELL, Assistant Examiner

U.S. Cl. X.R.

93—36 R, 36 PC, 36 SQ, Dig. 1; 53—375; 156—322, 324, 497